March 17, 1970          W. BLINDER          3,501,038

BALL ROTATOR FOR BALL INSPECTION AND/OR SORTING APPARATUS

Filed June 29, 1966          2 Sheets-Sheet 1

INVENTOR.
William Blinder
BY
F. J. Fadale
ATTORNEY

March 17, 1970 W. BLINDER 3,501,038
BALL ROTATOR FOR BALL INSPECTION AND/OR SORTING APPARATUS
Filed June 29, 1966 2 Sheets-Sheet 2

INVENTOR.
*William Blinder*
BY
*F. J. Fadale*
ATTORNEY

United States Patent Office 3,501,038
Patented Mar. 17, 1970

3,501,038
BALL ROTATOR FOR BALL INSPECTION AND/OR SORTING APPARATUS
William Blinder, Newington, Conn., assignor to General Motors Corporation, Detroit, Mich., a corporation of Delaware
Filed June 29, 1966, Ser. No. 561,629
Int. Cl. B65g 7/10; B24b 5/18
U.S. Cl. 214—340                                    4 Claims

ABSTRACT OF THE DISCLOSURE

My disclosure relates generally to ball inspection mechanisms and/or sorting apparatus and more particularly to a mechanism for speedily rotating a ball simultaneously about two intersection axes so that its total surface may be scanned.

---

It is common practice in the bearing industry to inspect balls, separating thos balls having surface defects, and segregating the good balls according to their accuracy of sphericity. In critical bearing applications, the inspection is usually total while in the ordinary applications, the inspection is usually selective. A typical apparatus for scanning ball surfaces is disclosed in the U.S. patent to Perkins 2,845,177 assigned to the assignee of my invention. In such apparatus, it is highly desirable that the entire surface of the ball be scanned for defects and that the entire surface be presented to the scanning device rapidly since inspection time is at a premium on the production floor.

On the presently available ball rotators, either no attempt is made at scanning the entire surface of the ball or there is no assurance that the entire surface of the ball will be scanned. In the above noted Pekins patent, for instance, the ball rotates about a single fixed axis so that the entire surface is not scanned. In other rotators, the ball is rotated about two axes, such as a rotator in which a ball is supported by three rollers with one of the rollers being cylindrical and axially movable to give a precessing rotation to the ball. However, in this arrangement, there is skidding between the ball and the rollers and, consequently, no assurance that the entire surface is scanned. The same drawback is present in the four roller scheme disclosed in the U.S. patent to Bickley 2,778,497.

Accordingly, my invention is directed toward providing a ball rotator in which a precessing rotation is positively imparted to the ball which in turn is positively rotated. By positively rotated, mean frictionally driven without any skidding between the ball and the roller which engages it.

In other words, the object of my invention is to provide a ball rotator in which the ball is positively rotated about two intersecting axes so that its absolute axis of rotation is constantly changing. By this arrangement, the entire ball surface can be rapidly scanned by a scanning device having only a minute instantaneous ball coverage. Quantitatively, I have found my rotator is capable of presenting the entire surface of a ball (of a diameter within the size normally used in today's ball bearing designs) to a scanning device in a matter of a few seconds.

With these and other objects in view, as will hereinafter more fully appear, and which will be more particularly pointed out in the appended claims, reference is now made to the following description taken in connection with the accompanying drawings in which:

Figure 1:
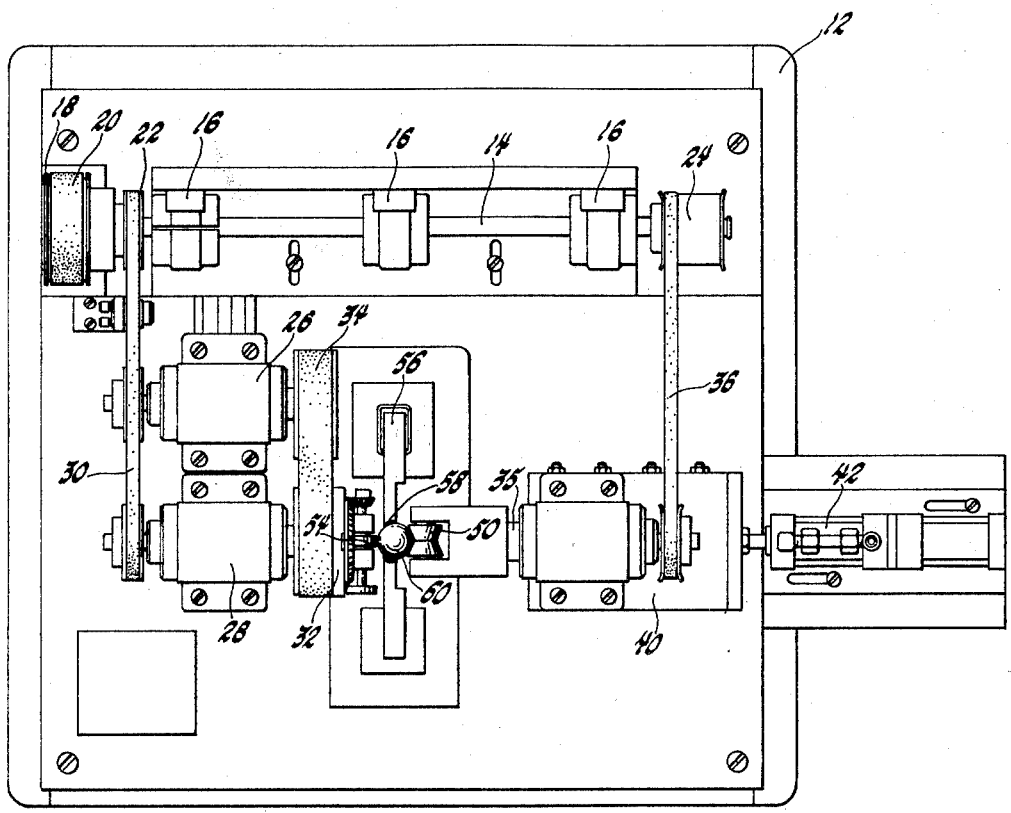
FIGURE 1 is a plan view of a ball rotator in accordance with my invention.
Figure 2:
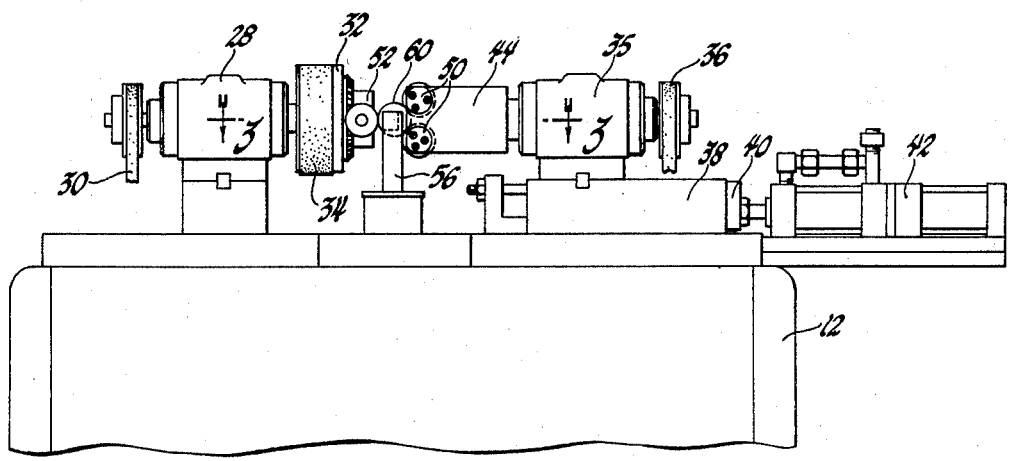
FIGURE 2 is an elevation view of the ball rotator shown in FIGURE 1.

Referring now to FIGURE 1 of the drawings, I have shown a support or table 12 which has a drive shaft 14 mounted parallel to its rear edge. The drive shaft 14 is located on the table 12 by three spaced bearing mounts 16. A pulley 18 secured to the left end of the shaft 14 is driven by a belt 20 which protrudes through a hole in the table 12 for driving connection with an electric motor (not shown) mounted below the table. Just inboard of the pulley 18 and on the right end of the shaft 14 are a pair of drive pulleys 22 and 24, respectively. The drive pulley 22 drives a pair of mounted spindles 26 and 28, respectively, through a second belt 30. The right end of the spindle 28 is surrounded by a housing 32 which is rotatable with respect to the spindle 28 and is driven by belt 34 on the output side of the spindle 26. The drive pulley 24 on the right-hand end of the drive shaft 14 drives a third spindle 35 through belt 36. Belts 30 and 36 are timing belts or any other suitable type of power transmission means which imparts a positive drive to the spindles 28 and 35 to insure zero slippage so that the spindles 28 and 35 are driven in synchronism. The spindle 35 is mounted on a carrier 40 which is slidable within a track 38. The spindle 35 is in axial alignment with the spindle 28 and is translatable toward and away from it. The carrier 40 on which the spindle 35 is mounted is connected to a fluid motor 42 which is suitably controlled to move the spindle 35 toward and away from the spindle 28 see FIGURE 2. The spindle 35 carries an adapter 44 on the end of which are a pair of vertically spaced rotatably mounted idler rolls 50. The end of spindle 28 also carries an adapter 52 on which is rotatably mounted a drive roll 54. The spacing of the rolls 50 and 54 is such that they form a ball receiving pocket in their operative position. In addition, the table 12 is provided with a pair of L-shaped arms 56 which are at right angles to the aligned spindles 28 and 35. The ends of the arms 56 are aligned and spaced with spaced ends 58 being suitably contoured to aid in supporting a ball 60 until the idler rolls 50 are in their operative position.

Figure 3:
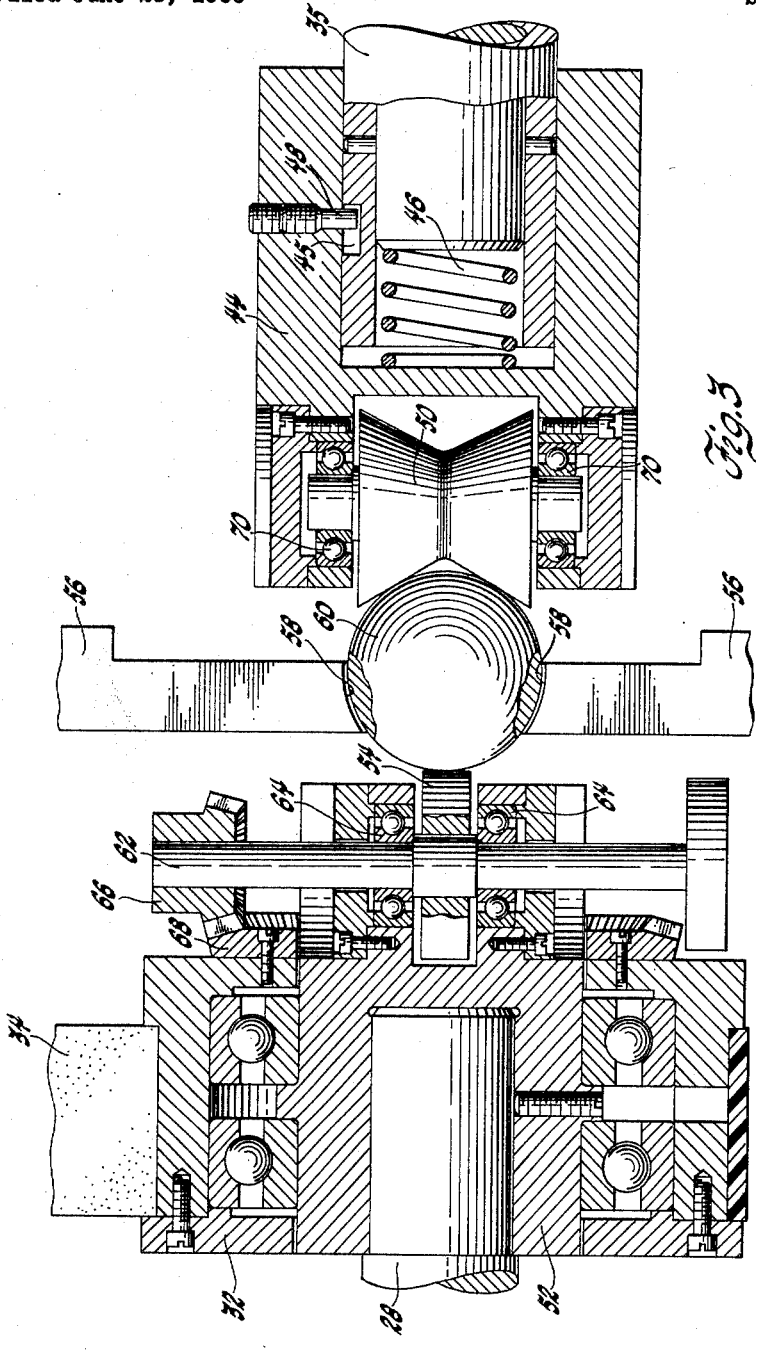
FIGURE 3 is a section taken along the line 3—3 of FIGURE 2 and looking in the direction of the arrows.

Referring now to FIGURE 3, the details of the ball rotator in the area of the ball receiving pocket are shown. The drive roll 54 is mounted on a shaft 62 which is journaled in the end of adapter 52 by ball bearings 64. The shaft 62 is thus journaled for rotation about an axis perpendicular to the axis of the spindle 28. One outer end of the shaft 62 carries a bevel gear 66 which meshes with a bevel ring gear 68 mounted on the face of the housing 32. The vertically spaced idler rolls 50 are likewise journaled in the end of the adapter 44 by ball bearings 70. The rolls of V-shaped contour are rotatable about parallel axes which lie in a plane perpendicular to the axis of the spindle 35—the axes of the idler rolls 50 being spaced on opposite sides of the axis of the spindle 35. The adapter 44 is biased away from the spindle 35 by a spring 46. A detent 48 mounted on the adapter 44 protrudes into an axial groove 45 in the spindle 35 to limit the relative axial movement between the adapter 44 and the spindle 35 and to positively locate the adapter 44 circumferentially with respect to the spindle 35.

The operation of my ball rotator is as follows. With the spindle 35 in its retracted position, a ball such as 60 is dropped from a chute (not shown) above the ends of the arms 56 and is momentarily supported by the arms 56 and drive roll 54. The fluid motor 42 is actuated to bring the idler rolls 50 into engagement with the ball 60. Note that the adapter 44 is biased away from the spindle 35 so that a light resilient load is applied between the idler rolls 50 and the ball 60 and between the drive roll 54 and the ball 60. This light spring load aids in the frictional engagement between the ball and the rolls. When the ball is thus engaged, it is preferably lifted slightly from surfaces 58 on the arms 56 to eliminate drag on the ball as it is rotated. The motor (not shown) is energized and the spindles 26, 28, and 35 are driven thereby through the drive pulley 20, drive shaft 14, pulleys 22 and 24, belts 30 and 36, respectively. The drive ratio is such that the aligned spindles 28 and 35 are driven at the same speed which causes the ball 60 to rotate about the axis of the aligned spindles 28 and 35 without skidding. The drive ratio to the housing 32 is driven at a different speed through belt 34 and is selective. It can be driven faster or slower than the spindles 28 and 35 or disconnected and fixed against rotation. The only requirement is that there be a differential speed between the housing 32 and the spindle 28. This differential speed rotates the drive roller 54 about the longitudinal axis of the shaft 62 through bevel gear 66 and ring gear 68. The ball 60 is thereby rotated about an axis perpendicular to the axis of the spindles 28 and 35. Since the rolls 54 and 60 are journaled perpendicular to the axis of the spindles 28 and 35 and are in the plane of the spindle axis, the ball 60 is driven frictionally without skidding. Thus the ball 60 is simultaneously and positively rotated about two axes giving a precessing spin to the ball 60 so that the absolute axis of rotation is constantly changing, and thus my ball rotator assures that the entire surface of the ball 60 is presented to a scanning device. The amount of precessing spin given to the ball 60 is determined by the speed ratio of the spindle 28 and the housing 32 and is adjustable to obtain the optimum precession rate for the type of inspection being performed.

A scanning device which can be conveniently located on the table 12 in the vicinity of the ball 60 has not been shown because it forms no part of my invention since my rotator can be used with any type of scanning device. The scanning device can be of the optical type disclosed in the aforementioned Perkins patent. Other nonlimiting examples of scanners are eddy current or electromagnetic types.

After the entire surface of the ball 60 has been presented to the scanner, the spindle 35 is retracted toward the right as viewed in FIGURE 3. The ball 60 may then be dropped into a receiving chute (not shown), which may be designed to receive a signal from the scanner to segregate the good balls from the bad balls. This feature is also not shown as it forms no part of my invention.

It should be understood, of course, that the foregoing disclosure relates to only a preferred embodiment of my invention and that numerous modifications or alterations may be made therein without departing from the spirit and scope of my invention as set forth in the appended claims.

I claim:
1. A ball rotator comprising:
a first shaft having a longitudinal axis,
a pair of rollers journaled on said shaft adjacent one end thereof and on opposite sides of said axis,
the axes of rotation of said rollers being parallel and each of said axes lying in a plane perpendicular to the longitudinal axis of said first shaft,
a second shaft coaxial with said first shaft,
a housing rotatably mounted on said second shaft,
a third roller journaled on said second shaft with its axis intersecting said longitudinal axis of said second shaft and parallel to the axes of said pair of rollers, said rollers being spaced so as to frictionally engage a ball placed therebetween,
coupling means between said first and second shafts whereby they are adapted to be driven at the same speed,
differential drive means between said housing and said third roller, and
means to cause relative rotation between said housing and said second shaft when said second shaft is rotating whereby said ball is given a precessing rotation while being rotated about the longitudinal axis of said first shaft whereby the entire surface of the ball can be presented to a given point fixed in relation to the ball.

2. The ball rotator as defined in claim 1 wherein said housing carries a beveled ring gear and said third roller carries a bevel gear meshing with said ring gear.

3. The ball rotator as defined in claim 1 wherein said first shaft is translatable toward and away from said second shaft.

4. In a ball rotator having a pair of axially spaced shafts rotatable about a common longitudinal axis and a plurality of rollers journaled on said shafts transverse to said longitudinal axis and spaced so as to frictionally engage and support a ball with its center on said axis, the improvement comprising:
one of said rollers journaled on one of said shafts with its axis intersecting said longitudinal axis,
a housing rotatable on said one shaft,
a differential drive means between said roller and said housing, and
means to cause relative rotation between said one shaft and said housing when said shaft is rotating whereby said ball is given a precessing rotation as it is rotated about said longitudinal axis.

References Cited
UNITED STATES PATENTS 1,131,611  3/1915  Newman et al.
2,628,462  2/1953  Babcock _____ 51—103 X HUGO O. SCHULZ, Primary Examiner U.S. Cl. X.R.

51—103, 236